United States Patent [19]

Nimura et al.

[11] Patent Number: 5,757,289
[45] Date of Patent: May 26, 1998

[54] VEHICULAR NAVIGATION SYSTEM

[75] Inventors: Mitsuhiro Nimura, Okazaki; Akimasa Nanba, Chiryu; Kazuteru Maekawa, Nishikamo-gun, all of Japan

[73] Assignee: Aisin Aw Co., Ltd., Japan

[21] Appl. No.: 466,193

[22] Filed: Jun. 6, 1995

[30] Foreign Application Priority Data

Sep. 14, 1994 [JP] Japan ................................... 6-247293
Oct. 3, 1994 [JP] Japan ................................... 6-264584

[51] Int. Cl.$^6$ ................................................. G08G 1/123
[52] U.S. Cl. ...................... 340/995; 340/990; 364/449.3; 364/449.4
[58] Field of Search ........................ 340/995, 990, 340/988; 364/449.3, 444, 449.2, 449.4, 449.5; 73/178 R

[56] References Cited

U.S. PATENT DOCUMENTS

| | | |
|---|---|---|
| 5,043,902 | 8/1991 | Yokoyama et al. ............ 340/995 |
| 5,184,303 | 2/1993 | Link .................................. 340/995 |
| 5,243,528 | 9/1993 | Lefebvre ......................... 340/995 |
| 5,262,775 | 11/1993 | Tamai et al. ................... 340/995 |

*Primary Examiner*—Brent A. Swarthout
*Attorney, Agent, or Firm*—Lorusso & Loud

[57] ABSTRACT

A vehicular navigation system includes a central control unit which determines when a present position deviates from a searched route along which guidance is being provided from a starting point to a destination and determines whether or not the detected deviating present position is on a guidable road prior to re-searching the route and providing guidance based upon the re-searched route. A guidable road is a road upon which the navigation system contains sufficient map information and guide information for the navigation system to search a route and provide guidance. Additionally, system determines whether the vehicle has traveled a predetermined distance after re-search of the route prior to providing travel guidance based upon the re-searched route. Otherwise travel guidance continues to be provided based upon the previously searched route. A driver, after making a short deviation, may thus return to the previous route without travel guidance being interrupted by a re-searched route.

3 Claims, 20 Drawing Sheets

GUIDE ROAD STRING DATA

| NO. OF GUIDE ROADS |
|---|
| 61 |
| 62 |
| 63 |
| 67 |
| 71 |
| 74 |
| 75 |
| 76 |

Fig. 7

DATA STRUCTURE

GUIDE ROAD DATA (a)

| NO. OF ROADS(n) | |
|---|---|
| 1 | ROAD NO. |
| | LENGTH |
| | ROAD ATTRIBUTE DATA |
| | SHAPE DATA ADDRESS & SIZE |
| | GUIDE DATA ADDRESS & SIZE |
| ⋮ | |
| n | |

SHAPE DATA (b)

| NO. OF NODE(m) | |
|---|---|
| 1 | EAST LONGITUDE |
| | NORTH LATITUDE |
| ⋮ | |
| m | |

GUIDE DATA (c)

| INTERSECTION NAME |
|---|
| ATTENTION DATA |
| ROAD NAME |
| ROAD NAME VOICE DATA ADDRESS & SIZE |
| DESTINATION DATA ADDRESS & SIZE |

DESTINATION DATA (d)

| NO. OF DESTINATIONS (k) | |
|---|---|
| 1 | DESTINATION ROAD NO. |
| | DESTINATION NAME |
| | DESTINATION NAME VOICE DATA ADDRESS & SIZE |
| | DESTINATION DIRECTION DATA |
| | RUN GUIDE DATA |
| ⋮ | |
| k | |

DESTINATION DIRECTION DATA (e)

| | |
|---|---|
| −1 : | INVALID |
| 0 : | UNNECESSARY |
| 1 : | STRAIGHT |
| 2 : | TO THE RIGHT |
| 3 : | OBLIQUELY TO THE RIGHT |
| 4 : | RETURN TO THE RIGHT |
| 5 : | TO THE LEFT |
| 6 : | OBLIQUELY TO THE LEFT |
| 7 : | RETURN TO THE LEFT |

Fig. 8
ROAD ATTRIBUTE DATA

EXISTENCE INFORMATION  YES: ○

| | | |
|---|---|---|
| OVERHEAD/ UNDERGROUND ROAD DATA | OVERHEAD ROAD | |
| | SIDE OF OVERHEAD ROAD | |
| | UNDERGROUND ROAD | ○ |
| | SIDE OF UNDERGROUND ROAD | |
| NO. OF LANES | MORE THAN THREE | |
| | TWO | ○ |
| | ONE | |
| | NO CENTER LINE | |

Fig. 9
ROAD NAME DATA

| ROAD KIND | KIND NO. |
|---|---|

| | | |
|---|---|---|
| EXPRESS WAYS | MAIN LANES | 1 |
| | TRANSFER RAMPS | 2 |
| URBAN EXPRESS WAYS | MAIN LANES | 3 |
| | TRANSFER RAMPS | 4 |
| TOLL ROADS | MAIN LANES | 5 |
| | TRANSFER RAMPS | 6 |
| GENERAL ROADS { | NATIONAL ROADS | 7 |
| | PREFECTURAL ROADS | 8 |
| | OTHERS | 9 |

Fig.10

ATTENTION DATA

| CROSSING | ○ |
|---|---|
| TUNNEL ENTRANCE | |
| TUNNEL EXIT | |
| WIDTH REDUCING POINT | |
| NO | |

Fig.11

RUN GUIDE DATA

| CLOSER TO THE RIGHT | |
|---|---|
| CLOSER TO THE LEFT | |
| CLOSER THE CENTER | ○ |
| NO | |

Fig. 12

GUIDING INTERSECTION DATA(a)

| | NO. OF INTERSECTIONS (n) | |
|---|---|---|
| 1 | COORDINATE OF EAST LONGITUDE | |
| | COORDINATE OF NORTH LATITUDE | |
| | INTERSECTION LANDMARK ADDRESS & SIZE | |
| | ⋮ | |
| n | | |

INTERSECTION LANDMARK DATA(b)

| | NO. OF LANDMARKS (m) |
|---|---|
| 1 | EAST LONGITUDE OF LANDMARK CENTER |
| | NORTH LATITUDE OF LANDMARK CENTER |
| | LANDMARK DATA |
| | ⋮ |
| m | |

Fig. 13

LANDMARK DATA

| KINDS | | | DATA (Pedestrian Bridge and Railroad Indicate Angle of Intersection) |
|---|---|---|---|
| LETTERS | | | |
| LANDMARK | | | |
| PEDESTRIAN BRIDGE | | | |
| RAILROAD | OVERHEAD | O | |
| | ON-ROAD | | |
| | UNDER-ROAD | | |
| | UNDER-GROUND | | |

ACQUIRE REMAINING DISTANCE (C) TO BE DISPLAYED

ACQUIRE WIDTH (A) OF INTERSECTING ROADS 101a, 101c - GUIDABLE ROADS
101b, 101d - UNGUIDABLE ROADS
101e - BLIND ROAD
101f - PLACE OTHER THAN ROADS

FAILURE IN SEARCH

DISPLAY OF PREVIOUS ROUTE

1

VEHICULAR NAVIGATION SYSTEM

BACKGROUND OF THE INVENTION

1. Field of the Invention

The present invention relates to a vehicular navigation system for guiding travel along a route to a destination and, more particularly, to a vehicular navigation system capable of automatically re-searching the route when a deviation from the route occurs.

2. Related Art

The prior art includes vehicular navigation systems for detecting a deviation of a vehicle from a route set by the driver and for performing a re-search of the route when the deviation is sensed to then provide route guidance according to the re-searched route. During travel along a route set by the navigation system, the vehicle driver may mistakenly deviate from the set route. In order to overcome this mistake, there is disclosed in Japanese Patent Laid-Open No. 173815/1989, for example, a technique in which the driver is instantly informed of the route deviation and in which a new route is re-searched on condition that the vehicle is stopped.

In the aforementioned example of the prior art, the route is re-searched from the present position, at which the vehicle is stopped because of the route deviation, to the previously set destination. Generally vehicle navigation systems have limited capacity for data required to conduct route searches and perform guidance. In order for a vehicle navigation system to contain all data relating to parking lots and minor roads, an extraordinarily massive storage capacity for data would be necessary. In case the vehicle is stopped in a parking area or on a minor road which is not indicated on the navigation system map data, the search of the route from that stop point cannot be performed. Because of the limited data capacity, the re-search of the guidance route from the present position cannot be started before the vehicle is stopped on a road covered by the data. This obliges the driver to stop on a road covered by the navigation system map data. It may be unknown where such a road is located, especially in case the driver has lost his or her way. The driver may not know where he or she is, and may be bewildered by ignorance of whether or not any nearby road is covered by the navigation system map or ignorance of which direction a searchable road can be found. On the other hand, if the route search is made while the vehicle is on an unguidable road, it is started from a point on the guidable road which is closest to the present position. This obliges the driver to drive the vehicle to the searched route by himself or herself, and raises a problem that the driver may have to search for the searched route.

SUMMARY OF THE INVENTION

An object of the present invention is to solve the above-specified problems and to provide a vehicular navigation system capable of re-searching a guidance route with limited data without bewildering the driver.

In order to achieve the aforementioned object, according to one aspect of the present invention, a vehicular navigation system, upon detecting that a present position deviates from a searched route along which guidance is being provided from a starting point to a destination, determines guide road propriety by deciding whether or not the detected deviating present position is on a guidable road prior to re-searching the route. If not, the previous guidance display remains; otherwise guidance is provided based upon the re-searched route. A guidable road is a road upon which the navigation system contains sufficient map information and guide information for the navigation system to search a route and provide guidance.

According to another aspect of the present invention, a vehicular navigation system, upon detecting that a present position deviates from a searched route along which guidance is being provided from a starting point to a destination, determines firstly whether the detected deviating present position is on a guidable road prior to re-searching the route and determines secondly whether the vehicle has traveled a predetermined distance after re-search of the route prior to providing travel guidance based upon the re-searched route. Otherwise travel guidance continues to be provided based upon the previously searched route. A driver, after making a short deviation, may thus return to the previous route without travel guidance being interrupted by a re-searched route.

BRIEF DESCRIPTION OF THE DRAWINGS

FIG. 7 is an explanatory diagram of guide road data;

FIG. 8 is an explanatory diagram of road attribute data;

FIG. 9 is an explanatory diagram of road name data;

FIG. 10 is an explanatory diagram of attention data;

FIG. 11 is an explanatory diagram of run guide data;

FIG. 12 is an explanatory diagram of guiding intersection data;

FIG. 13 is an explanatory diagram of landmark data;

DESCRIPTION OF THE PREFERRED EMBODIMENT

In the following, an embodiment of the present invention is described with reference to the accompanying drawings.

Figure 2:
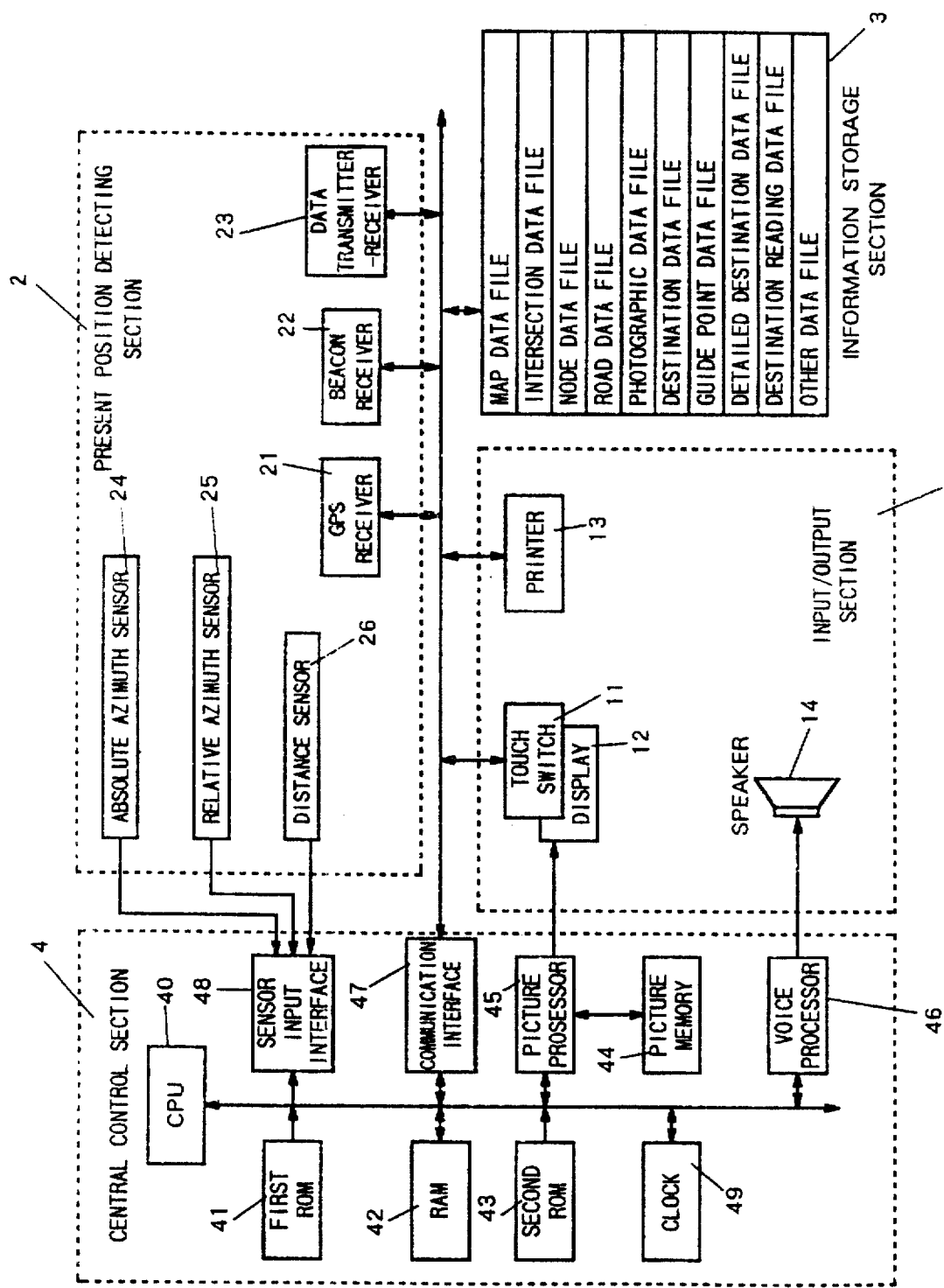
FIG. 2 is a diagram of a hardware construction of the vehicular navigation system.

In FIG. 2, the navigation system is constructed to include an input/output section 1 for inputting/outputting route guidance information, a present position detecting section 2 for detecting information on the present position of the vehicle, an information storage section 3 containing stored or recorded navigation data necessary for calculating a route and guide data necessary for the route guidance, and a central control section 4 for controlling the entire system, for searching or calculating a route and for generating display and/or voice guidance signals necessary for route guidance.

The input/output section 1 enables a user to receive and provide information or instructions to the central control section 4 for vehicle navigation such as information necessary for setting route guidance points such as a starting point, a destination point or a transit point, and to output processed data or data for data communications for printing. To enable user input, the input section is constructed of a touch or screen panel 11 superposed over a display 12 for inputting an address, a telephone number or coordinates to set the destination and for requesting route guidance. The output section has (1) a display 12 for displaying data on a screen, input options for the driver or route guidance information automatically on the screen, (2) a printer 13 for printing data processed by the central control section 4, data stored in the information storage section 3, or communication data, and (3) a speaker 14 for outputting audio route guidance.

The display 12 is a color CRT or a color liquid crystal display and displays not only all the screens necessary for the navigation such as a destination setting screen, a section diagram screen or an intersection diagram screen, as based upon the map data or guide data processed by the central control section 4, but also displays keys used with the touch panel 11 for setting route guidance, for directing the progress of the route guidance, and for switching screens. A user by touching the touch panel 11 over a displayed function key inputs signals to the navigation system corresponding to the displayed function key so that the specified operation or function is executed.

The present position detecting section 2 is constructed of a GPS receiver 21 utilizing the global positioning system (GPS), a beacon receiver 22, a data transmitter-receiver 23 which for example can receive a correction signal of the GPS by using a cellular phone or a FM multiplex signal, an absolute azimuth sensor 24 made of for example an earth magnetism sensor, a relative azimuth sensor is made of for example a wheel sensor or a steering sensor, and a distance sensor 26 for detecting the distance traveled such as from the number of revolutions of the wheels.

The information storage section 3 is a data base with all the data files containing data necessary for the route searching and guidance such as map data, intersection data, node data, road data, photographic data, destination data, guide point data, detailed destination data or destination reading data, and remaining data such as the display guide data or the voice guide data.

The central control section 4 is constructed of a CPU 40 for executing arithmetic operations, a first ROM 41 containing a program for processing the route search, a program for the display control necessary for the route guidance and for voice output control necessary for the voice guidance, and data necessary for the programs, a RAM 42 for temporarily storing instructions such as route guidance and search information and other data being processed, a second ROM 43 containing display data necessary for route guidance and map display, a picture memory 44 containing picture data to be used for displaying screens, a picture processor 45 for fetching the picture data from the picture memory on the basis of display control signals coming from the CPU and for processing the picture data to output the processed data to the display, a voice processor 46 for synthesizing the voice data e.g., a phrase, a sentence or a sound read out of the information storage section 3 on the basis of the voice output control command from the CPU, and for transforming the synthesized data into analog signals to output the signals to the speaker, a communication interface 47 for arbitrating and controlling the transfer of data to and from sections 1, 2, 3 and 4, a sensor input interface 48 for fetching various sensor signals of the present position detecting section 2, and a clock 49 for writing the date and time in internal diagnostic information. The screen display and/or the voice output can be selected for guiding the driver along a route.

The present system determines the present position by calculating an estimated position on the basis of the various sensor signals and GPS data coming from the present position detecting section and by deciding the present road upon which the vehicle is traveling and its position on the road by correlation between the estimated position and data of the road on the map. In addition, the present system decides whether or not the present position, which is continuously updated, is approaching a guide point determined in advance with respect to its guidance route. Specifically, the present system automatically outputs voice announcements of intersections of the guide route at predetermined distances before and during passage through the intersection and to display intersection information such as the name of an approaching intersection. On the basis of this decision result, the picture processor and the voice processor are instructed to guide. In response to an input request signal, the voice processor is instructed to guide travel by voice.

Figure 1:
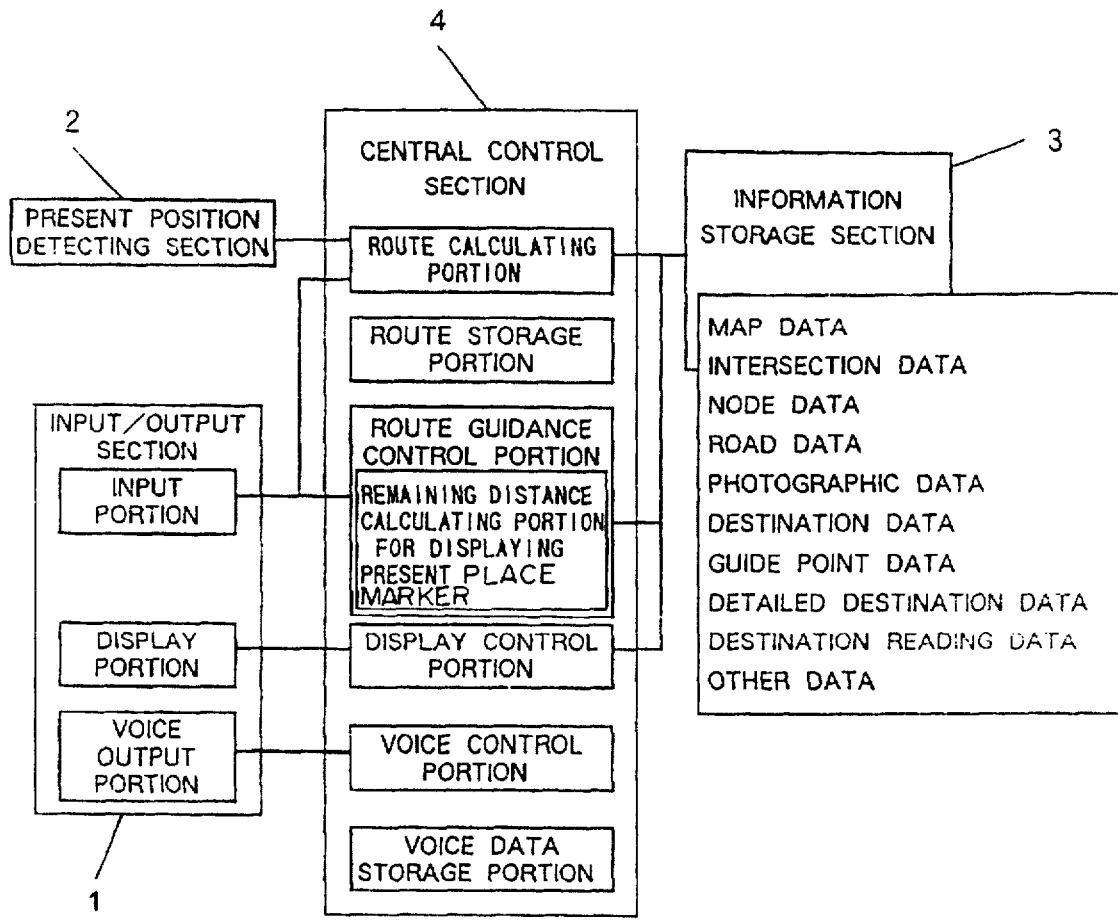
FIG. 1 is a block diagram showing a system construction of a vehicular navigation system according to the present invention.

As shown in FIG. 1, the central control section 4 includes a route calculating portion for determining the present position and the destination and for calculating the route between the present position and the destination. The present position of the vehicle is determined by the operation of the CPU on the basis of the GPS information received through the communications interface, map information or data from the information storage section, and information fetched through the sensor input interface from the sensors mounted on the vehicle. The destination of the route is determined from information input by the user through the input/output section and destination data from the information storage section. Calculation of the route between the starting point or present position and the destination is based upon map, intersection, node and road data read out of the information storage section as well as information coming from the present position detecting section. A route storage portion of the central control section temporarily stores route information calculated by the route calculation portion. A route guidance control portion executes voice guidance and/or display guidance automatically or in response to a request signal on the basis of the guide information stored in the information storage section, the present position information and the route information stored in the route storage portion. A voice control portion controls voice guidance. A display control portion controls the display on the display screen and the display guidance.

The route guidance control portion has a remaining distance calculating portion for displaying the distance of the present position or place marker from a guide point such as an intersection. Guide data, based on the present position detecting information coming from the present position detecting section and the route information stored in the route storage portion, is fetched from the information storage section to calculate the remaining distance display of the present position marker. Especially the display of the distance to an approaching intersection when the present position is within 300 m is controlled by the remaining distance display as determined by the following calculation:

$$C=B-A.$$

Figure 3:
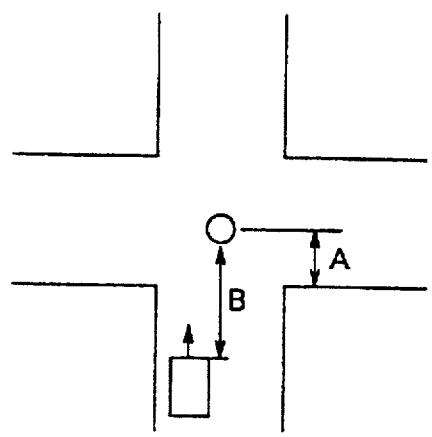
FIG. 3 is an explanatory diagram for calculating the remaining distance to be displayed.

In FIG. 3, A is the width of an intersecting road, B is the distance to the center of the intersection from the present position, and C is the remaining distance to be displayed. The display control portion controls the display of the present position marker on the basis of the calculated remaining distance.

Figure 4:
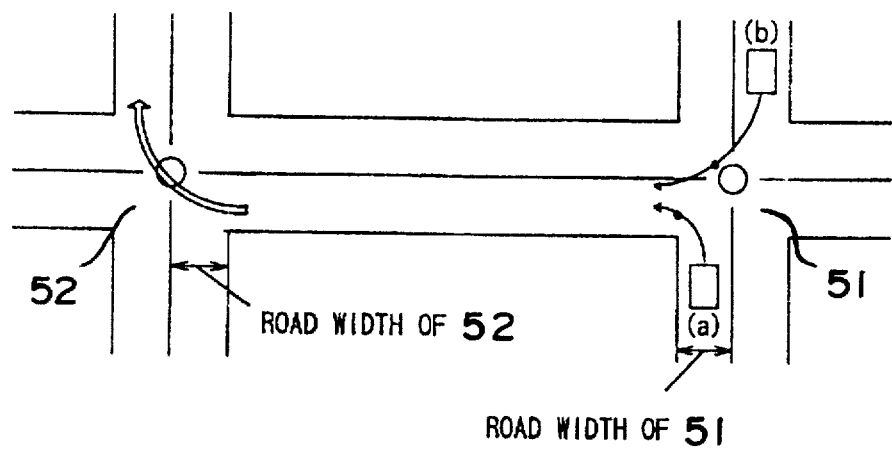
FIG. 4 is an explanatory diagram for explaining the remaining distance to be displayed, In case the remaining distances to a next intersection are made different by a turn to the left or right.

In case a vehicle turns at an intersection 51 to proceed to an intersection 52 at which the vehicle then turns to the right, as shown in FIG. 4, the distance to be covered differs for directions (a) and (b) entering the intersection 51. In the internal processing procedure, therefore, the covered distance between the intersections is measured by discriminating "before" and "after" the intersection from the turning peak point (as indicated by "●"). In FIG. 4, the remaining distance to be displayed is calculated by the following equation when the intersection distance between the intersections 51 and 52 is the internode (as indicated by "○") distance:

Case($b$):
Remaining Display Distance = (Section Distance − Road Width at Intersection 52) − Covered Distance between Intersections 51 and 52;
and
Case($a$):
Remaining Display Distance = (Section Distance − Road Width at Intersection 52 − Road Width at Intersection 51) − Covered Distance between Intersections 51 and 52.

The voice control portion synthesizes the voice data read out in response to the voice guide instruction and transforms the synthesized voice data into analog signals to output the analog signals from the voice output portion. The voice data storage portion contains voice guide data such as the operation guide data at the route setting time, the voice guide data of the destination or target name on the route, or the guide voice data necessary for voice guidance during the route guidance. When the display of the entire route diagram is instructed, the voice control portion reads the voice data of the target name, which is displayed in the entire route displaying screen, out of the voice data storage portion and transforms the voice data into analog signals to output the analog signals in the guide voice from the voice output portion.

Figures 5, 6:
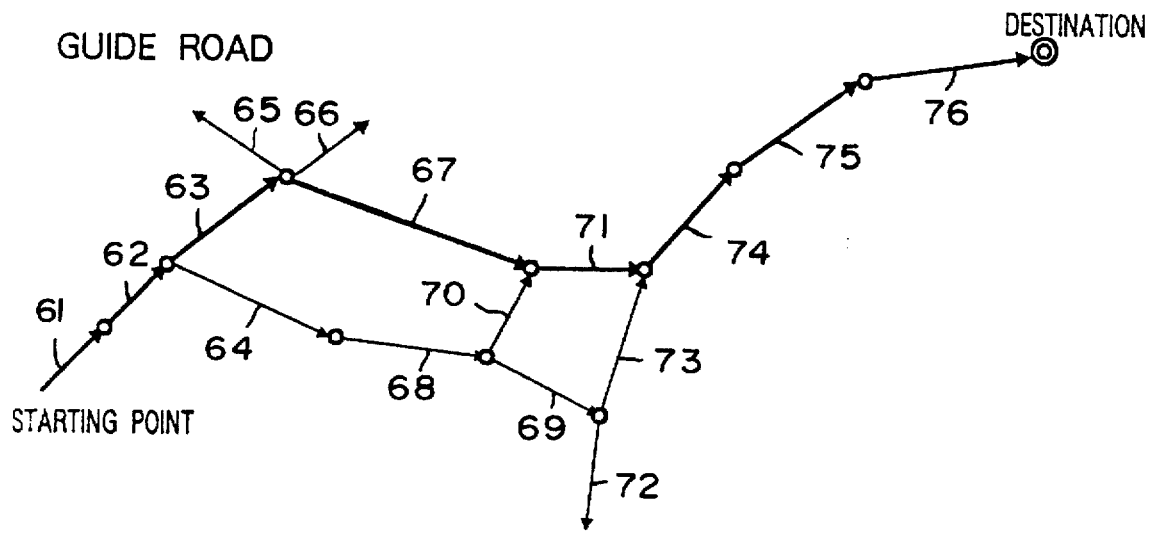
FIG. 5 is an explanatory diagram of guide roads from a starting point to a destination.
FIG. 6 is an explanatory diagram of guide road string data.

The data structure of the route guidance can be described by first referring to FIG. 5 which shows the guide road from the starting point to the destination. The road to be covered at first from the starting point is designated at "61". Points to be passed are designated by numerals subsequent to the road number, and all the roads joining the points such as the branching or function points or the intersections are designated by numerals. In the shown example, the roads leading from a road "62" are designated at "63" and "64", and roads "65", "66" and "67" lead from an intersection terminating the road "63". Moreover, roads "67" and "70" join at a junction leading to a road "71". This road "71" and a road "73" join together and lead to a road "74". The route leads to the destination through the roads "74", "75" and "76". In case the roads illustrated by thick lines are adopted as the guide route, for example, the route is composed of the eight guide roads having string data as shown in FIG. 6.

The data structure of each of the roads composing the guide road, as stored in the information storage section 3, is illustrated in FIG. 7. The guide road data (a) are defined for each road by the road number, the length, the road attribute data, the shape data address and size, and the guide data address and size. The shape data (b) express the shape of the road under consideration with the number of nodes, each of which is defined by coordinates of east longitude and north latitude, for example; If the angle of intersection of intersecting roads is used as the information of a road to be next followed in the calculation of the remaining display distance to the guide intersection, the shape data are given the data on the angle at which the road to be next followed intersects the road being followed. On the other hand, the guide data (c) are defined by the intersection name, the attention data, the road name, the road name voice data address and site, and the destination data address and size. The destination data (d) are defined by the destination road number, the destination name, the destination name voice address and size, the destination direction data and the run guide data. The destination direction data (e) are defined as messages of "INVALID", "UNNECESSARY", "STRAIGHT", "TO THE RIGHT", "OBLIQUELY TO THE RIGHT", "RETURN TO THE RIGHT", "TO THE LEFT", "OBLIQUELY TO THE LEFT" and "RETURN TO THE LEFT".

The road attribute data are those expressing physical characteristics such as overhead road, underground road or number of lanes, as shown in FIG. 8. The overhead/underground road data are exemplified by the information on existence of "OVERHEAD LOAD", "SIDE OF OVERHEAD ROAD", "UNDERGROUND ROAD", "SIDE OF UNDERGROUND ROAD". Lane number data are exemplified by the information on existence of "MORE THAN THREE", "TWO", "ONE" and "NO CENTER LINE". Incidentally if the road under consideration is a branch from an overhead road, it is defined as the "SIDE OF OVERHEAD ROAD". This definition likewise applies to a tunnel. In the present embodiment, the remaining distance display is determined by using the width of a road, which in turn is determined by calculating the number of lanes. However, the road width data may be listed as road attribute data. If the road widths are listed as data for all roads, the amount of data is excessively increased. In the present example the stored data is reduced by calculating the road width from the number of lanes. Moreover, the distance to be displayed during advancement of the present position marker may be calculated using information (such as the angle of intersection between the road being followed and the road to be next followed, or the width of the road to be next followed) on the road to be next followed.

The road name data are defined by the road kinds and the kind numbers, as shown in FIG. 9. The road kinds are classified as express ways, urban express ways, toll roads, and general roads such as national roads or prefectural roads. Especially, the express ways, the urban express ways and the toll roads are defined by main lanes and transfer ramps. The transfer ramps join the general roads and the main lanes, and the main lanes themselves.

The attention data include information for calling attention to various road states, as shown in FIG. 10, and are defined by crossing, tunnel entrance, tunnel exit, width reducing point and no attention point.

The run guide data are provided for improving safety and ease for travel onto a next portion of the route while the vehicle is running on a wide road or a road having two or more lanes. As shown in FIG. 11, the run guide data include an instruction "CLOSER TO THE RIGHT" for guidance in preparation for a course change to the right or obliquely to the right, for example. Similarly, an instruction "CLOSER TO THE LEFT" prepares for a course change to the left. The instruction "CLOSER TO THE CENTER" is given as a guide for passing through an intersection, i.e., for running straight. Alternatively, "NO" information is given when no guidance is necessary as the drive is continued straight along the road.

The intersection guiding data (a) are equal in number to the number of intersections to be guided, as shown in FIG. 12, and are defined by the intersection coordinates (i.e., the coordinates of east longitude and north latitude) indicating the position of each intersection, and the intersection landmark data address and size. In the case of the intersection of roads 63, 65, 66 and 67 in FIG. 5, for example, the name of the intersection with each road, as seen from the road 63, is contained in the guide data (c) of FIG. 7 but may be different in the individual directions, and the characteristics of these individual intersections are contained in the guiding intersection data of FIG. 12.

The intersection landmark data (b), as shown in FIG. 12, for each intersection include the landmarks characterizing the intersection. The individual landmarks are defined by their positions and attributes. Specifically, the landmarks are defined by the landmark positions (i.e., the east longitudes and the north latitudes of the landmark center) and the landmark data. FIG. 13 illustrates the contents of the landmark data. The landmark data are classified for the individual kinds of letters, landmarks (e.g., picture sign boards of gas stations or convenience stores), pedestrian bridges and railroads. The pedestrian bridges and the railroads are composed of data indicating the angles of intersection with the roads. Especially, the railroads are identified as overhead, on-road, under-road or underground. The guide intersection information in the navigation system, to which is applied the present embodiment, contains the guide characteristics of the aforementioned landmarks.

Figure 14:
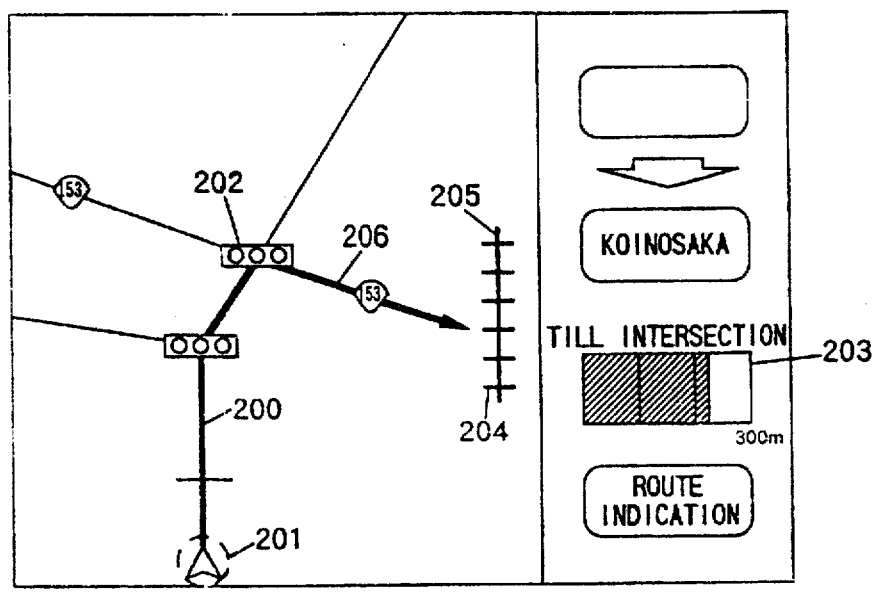
FIG. 14 is an explanatory diagram showing one example of a route display screen.

The route guidance screen is described by referring to FIG. 14 which shows the route display screen. This route display screen displays a guide map, in which is displayed a present position marker 201 indicating the present position and the advancing direction of the vehicle. Information of a guide intersection 202 on the route is displayed and includes the distance, if less than 300 m, to the guide intersection 202 as indicated in a bar graph display 203, along with the intersection name (e.g., KOINOSAKA). The driver is instructed to prepare for a change in the advancing direction at the intersection 202 by the map, the remaining distance to the intersection, and the intersection name. In case the vehicle is to turn to the right on route 153 (i.e. road 206), for example, the indicated distance of the present position marker 201 to the intersection 202 accounts for the width of the road onto which the vehicle is to turn rightward when the vehicle reaches a predetermined distance from the intersection. Specifically, the remaining distance (to be displayed) to the intersection is the difference of the distance from the present position to the intersection center minus the width of the intersecting road 206, and the display is made on the basis of the remaining distance. Thus, when the vehicle comes to the stop line in its approach an intersection, the present position marker is displayed at the intersection center so that the driver is guided safely and reliably to the position to turn to the right or left.

In case a crossing 204 is on the route, a railroad 205 is displayed, as shown, to call the attention of the driver. Incidentally, the crossing is stored as railroad data, as shown in FIG. 13, and is drawn on the crossing diagram on the basis of the intersecting situation with the road such as overhead or on the road surface and the angle of intersection with the road. Thus, no node string data is required for displaying the railroad separately, to make it possible to prevent any increase in the quantity of stored data.

In the present example, the calculated remaining distance is displayed as the remaining distance to the intersection in the bar graph so that the driver is easily enabled to recognize the remaining distance to the intersection by observing the bar graph display.

Figure 15:
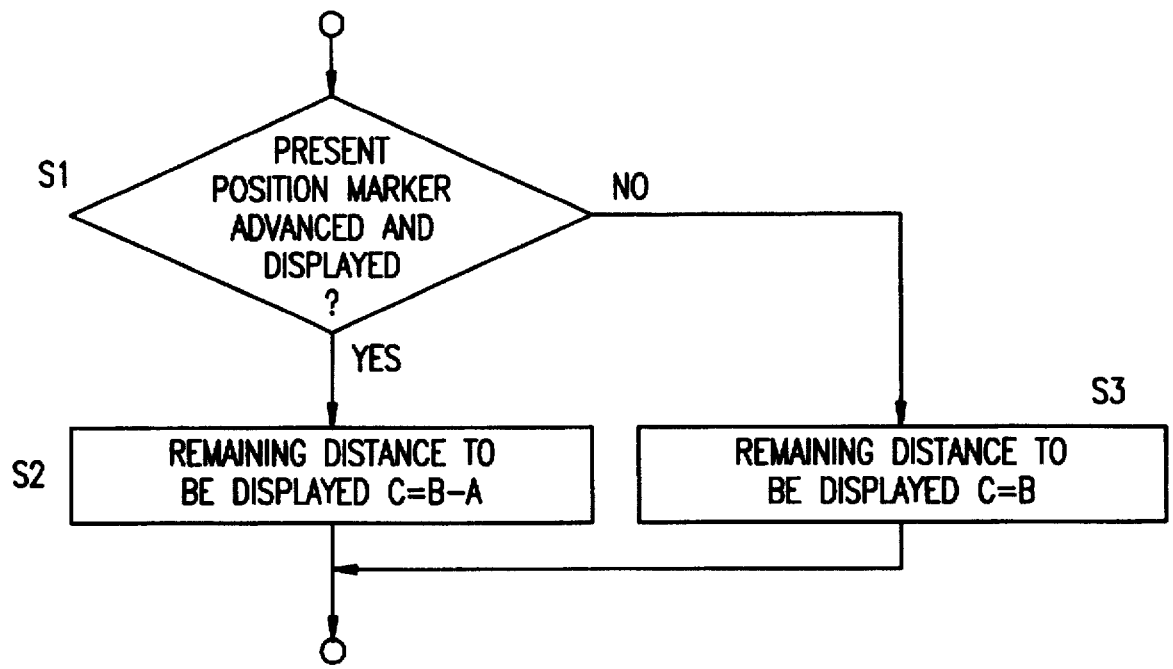
FIG. 15 is a flow chart for acquiring the remaining display distance.

In the routine for displaying the present place mark at the guide intersection, the acquisition of the remaining distance to be displayed is shown in FIG. 15. In the present example, the intersection diagram of FIG. 14 is displayed when the vehicle approaches within 300 m of the intersection. Since the intersection diagram displays a square of 300 m, the present position marker 201 is frozen at the center of the lower end and is kept frozen until the marker comes within 150 m of the intersection. The present position marker starts to move in proportion to the distance traveled when the distance to the intersection is less than 150 m.

In FIG. 15, A is the width of an intersecting road; B is the distance to the center of the intersection from the present position; and C is the remaining display distance. It is decided at S1 whether or not the present position marker is being advanced and displayed. If this question is affirmed, the remaining display distance C is determined at S2 by subtracting the width A of the intersecting road from the distance B to the intersection center. If the question is denied, the remaining display distance C is determined at S3 from the distance B to the intersection center. The conditions for the decision of S1 also include the angle of intersection between the road being followed and the road to be next followed, the width of the road and the number of lanes.

Figure 16:
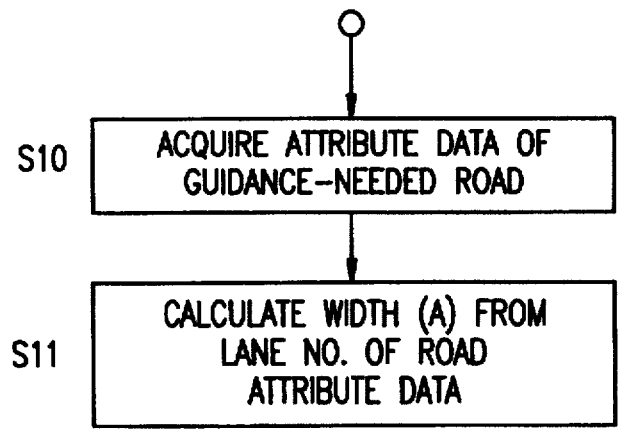
FIG. 16 is a flow chart for acquiring the width of an intersecting road.
Figure 17:
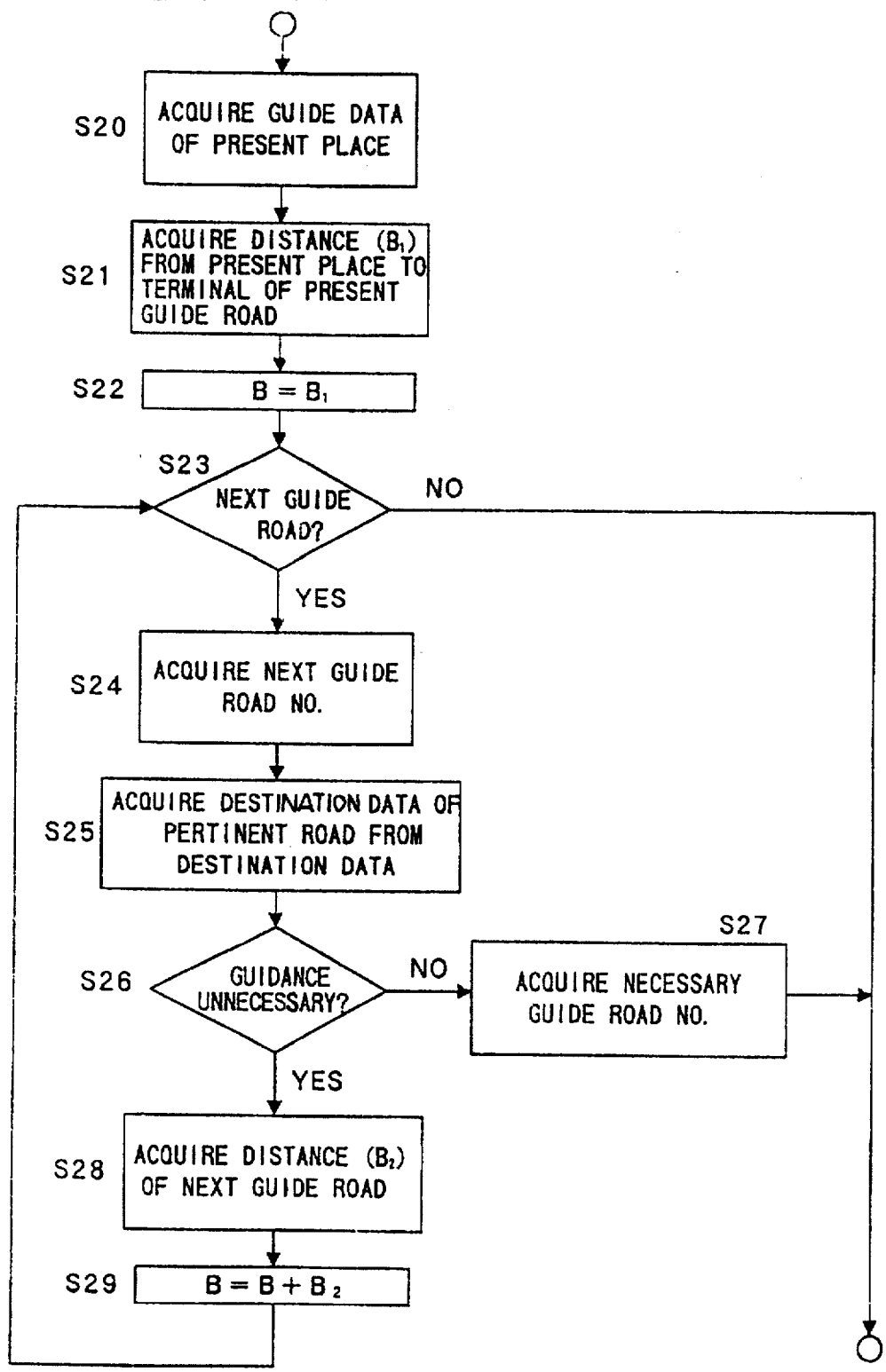
FIG. 17 is a flow chart for acquiring the distance from a present position to an intersection center.

The acquisition of the aforementioned width A of the intersecting road is executed, as shown in FIG. 16, by acquiring at S10 the road attribute data of the guidance-needed road and by calculating at S11 the width A from the number of lanes set forth in the road attribute data.

The acquisition of the distance B from the present position to the intersection center is executed, as shown in FIG.

17, by acquiring at S20 the guide road data of the present place and by acquiring at S21 the distance $B_1$ from the present position to the terminal point of the present guide road. The distance B from the present place to the intersection center is set at S22 to the distance $B_1$, and it is decided at S23 whether or not there is a next guide road. If this question is denied, the routine ends. If the question is affirmed, the next guide road number is acquired at S24, and the destination data of the present road intersection with the next guide road is acquired at S25 as run guide data from the destination data of the next road number. It is decided at S26 from the run guide data of the destination data whether or not the guidance is necessary. If the guidance is necessary, the guidance-needed guide road number is acquired at S27. If the guidance is unnecessary, the distance $B_2$ of the next guide road is acquired at S28, and the distance B is set at S29 to $B=B+B_2$. Then, the routine is returned to steps S23 and so on.

The present example is equipped with the decision means (i.e., step S1 of FIG. 15) for deciding whether or not the present position marker is to be advanced, from the intersection angle, the road width and the lane number, for example. However, the present position marker advancing step may be executed without such decision means. Moreover, the advance distance necessary for calculating the remaining display distance is prepared in advance as the data by considering the intersection angle and the road width, so that the display of the present position marker is controlled on the basis of the aforementioned set distance. In case, moreover, the present position marker is advanced and displayed, a control for advancing and displaying the present position marker can be made by considering the width of the road to be next followed.

Although the present example has been described exclusively on the display control of the present position marker at the guide intersection diagram, the display control of the present position marker according to the present example can be applied (1) to both the intersection diagram and the detailed diagram, (2) to only the intersection diagram, or (3) to only the detailed diagram.

According to the present example, the display control of the present position marker is executed, in correspondence with advance of the vehicle, by calculation of the remaining display distance by the remaining display distance calculating means while considering the information of the road to be next followed, so that the driver is guided by viewing the present position marker in approach to the guide intersection to turn the vehicle safely and reliably to the right or left.

Also the present position marker is displayed in an advanced position relative to the actual position of the vehicle by the width of the approaching intersecting road. When the vehicle reaches the stop line before entering the intersection the present position marker is advanced to the center of the intersection irrespective of the number of lanes of the intersecting road. As a result, the driver by viewing the present position marker can confirm the vehicle presence at the guide intersection to safely and reliably turn to the right or left.

Figure 18:
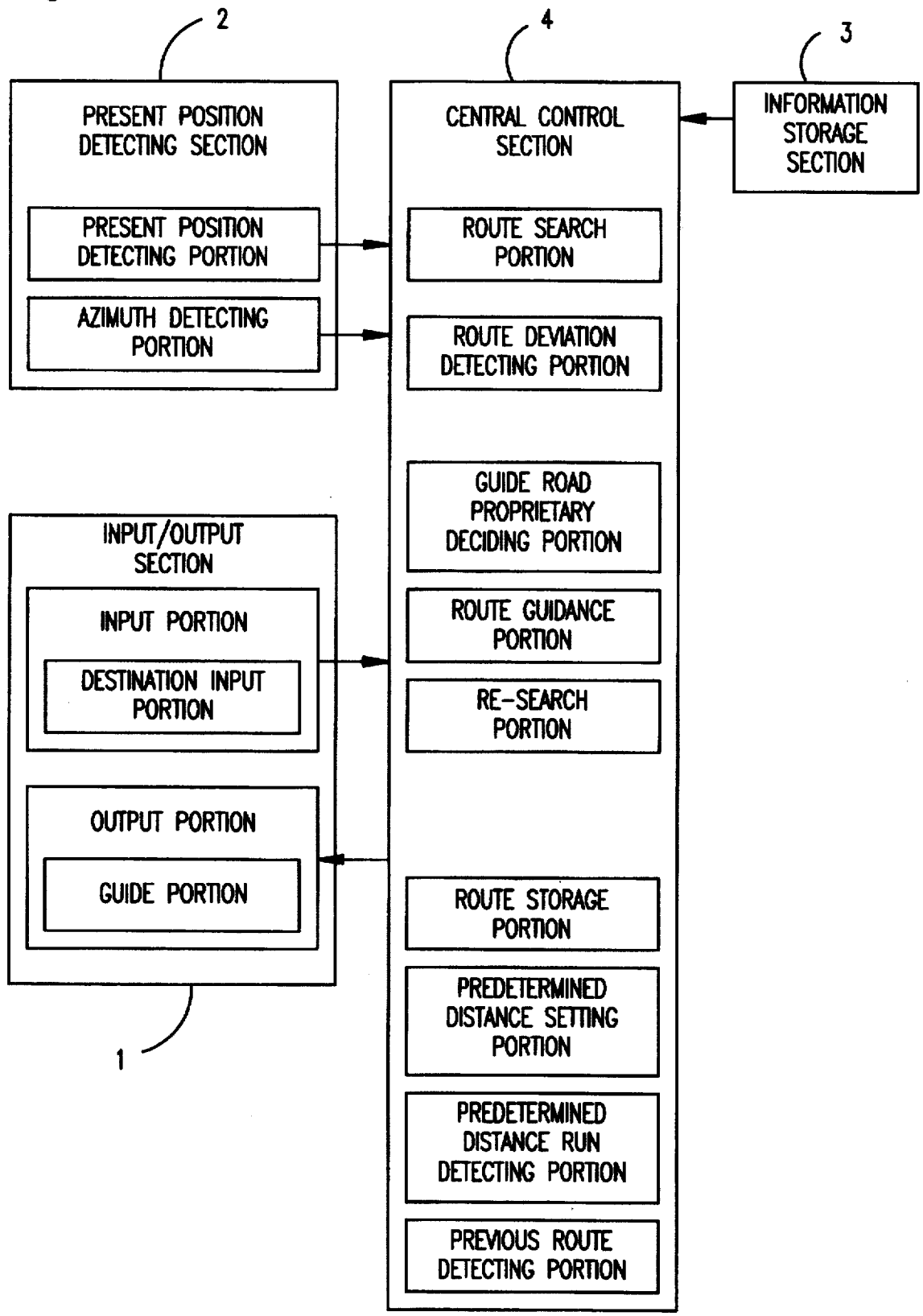
FIG. 18 is a block diagram showing a system construction of the vehicular navigation system according to the present invention.

FIG. 18 shows a hardware construction of a vehicular navigation system in accordance with the invention for executing the re-search of the optimum route when a deviation from the route occurs. The navigation system includes an input/output section 1, a present position detecting section 2, an information storage section 3 and a central control section 4 all containing several portions which are similar in names, construction and operation to that described above. The central control section 4 of FIG. 18 is equipped with a route calculation or search portion, a route guidance portion, a route deviation detecting portion, a guide road propriety deciding portion, a re-search portion, and a route storage portion. Additionally, the central control section also includes a predetermined distance setting portion, a predetermined distance travel detecting portion, and a previous route detecting portion. A route is calculated on the basis of destination information from the input/output section, present position information and advancing direction information from the position detecting section 2, and map information from the information storage section 3. The route guidance information thus processed by the central control section 4 is given to the driver through the guide portion of the output portion such as a display or an audio output.

The route search portion searches the route from the present position to the destination, for which preference is taken to the advancing direction of the vehicle obtained by the present position detecting section 2.

The route storage portion contains either the latest information on the route searched by the route search portion or the latest information on the route searched by the re-search portion.

The route deviation detecting portion detects that a deviation from the route in the route storage portion has occurred based on a current present position reading from the present position detecting portion. This route deviation detection can be exemplified by the method which is disclosed in Japanese Patent Laid-Open No.173815/1989, for example. The guide route propriety deciding means decides whether the deviated present position is on a guidable road or on an unguidable road or place. The unguidable roads or places are those for which map and guidance information sufficient to conduct a route search and route guidance cannot be found in the information storage section.

The re-search portion searches the route back to the previous route from the deviated present position from the present position detecting section 2 and for which route preference is taken to the vehicle advancing direction.

The guide portion displays the guide route which is provided by the route guidance portion of the central control section 4. The output and guide portion also display the re-search key in the input/output section display screen, especially when the route deviation detecting portion detects the route deviation, to encourage the driver to re-search the route from the deviated present position.

Figure 19:
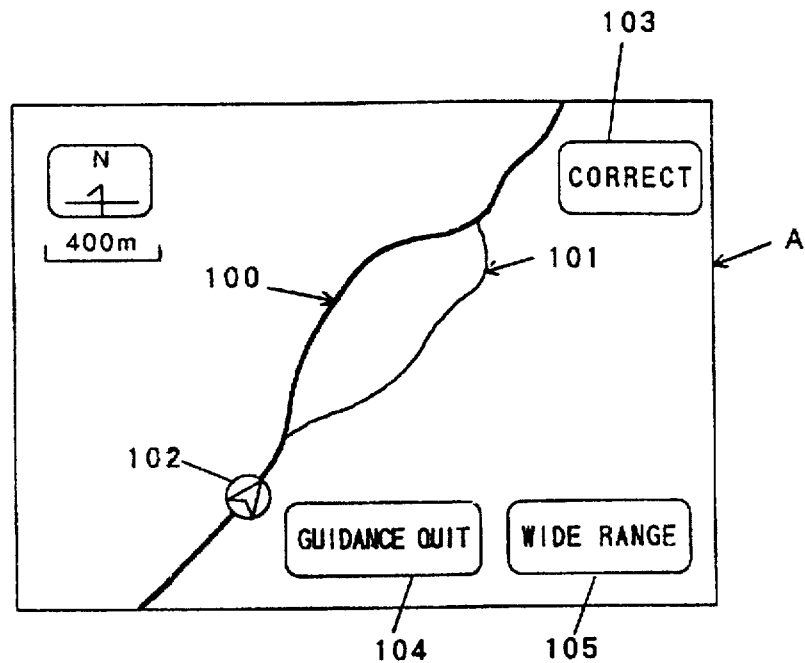
FIG. 19 is a diagram showing an example of the screen display of a section diagram.

The screen displayed in the guide or display portion after guidance has been started is shown in FIG. 19 as screen A. In the screen A, there are displayed a route 100, a road 101 other than the route, a present position marker 102 indicating the present position of the vehicle and the advancing direction on the route, and keys for enabling function selection by the touch screen input. In the present example, the route 100 is displayed in red color, and the function keys are exemplified by a correct key 103 for correcting the present position, a guidance quit key 104 for quitting the route guidance, and a wide range key 105 for displaying the entire route.

Figure 20:
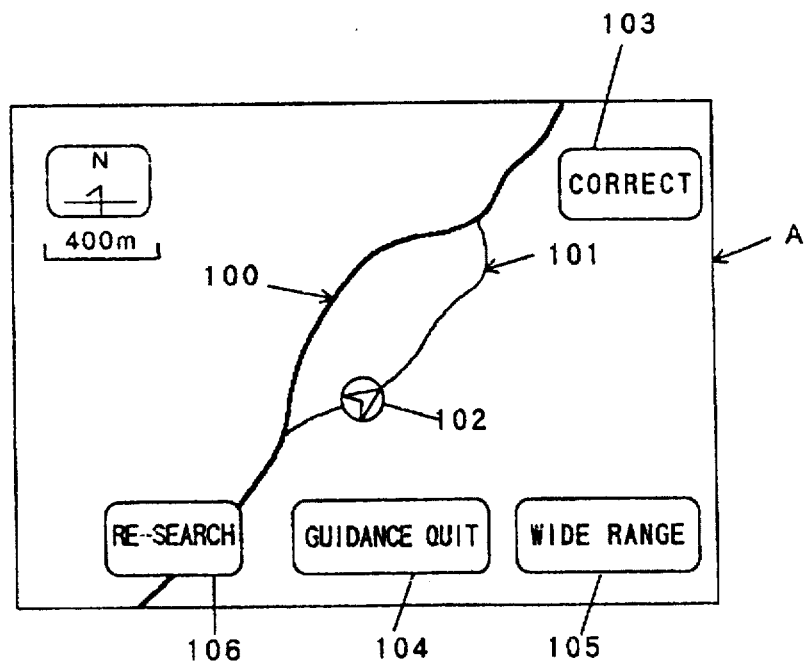
FIG. 20 is a diagram showing one example of the screen display of the section diagram at a route deviation time in a manual re-search mode.
Figure 21:
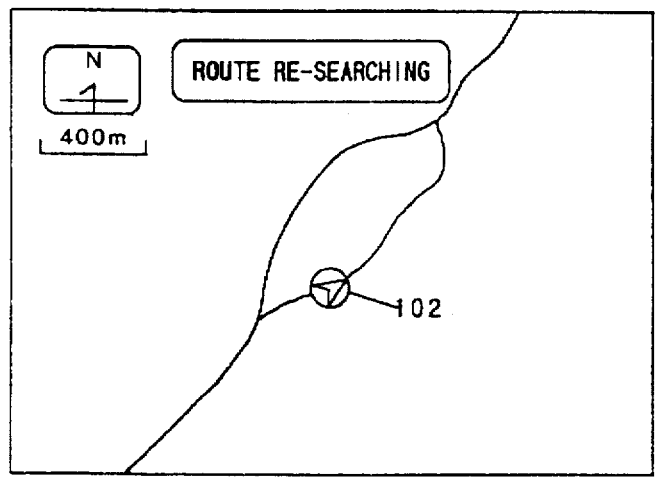
FIG. 21 is a diagram showing one example of the screen display of a section diagram at a route deviation time in an automatic re-search mode.

When the vehicle deviates from the searched route 100 by entering and traveling along the road 101 by at least a predetermined distance, the screen A displays a re-search key 106, as shown in FIG. 20, if the destination setting is made (for the manual re-search) to execute the re-search by a manual operation. When this re-search key 106 is depressed, the route re-search is started so that the "ROUTE RE-SEARCHING" is displayed in the screen. In case, on the other hand, the destination setting is made (for the automatic re-search) to execute the research automatically, the display screen is switched to one with no emphasized route, if the route deviation is detected, and the "ROUTE RE-SEARCHING" is displayed, as shown in FIG. 21.

Figure 22:
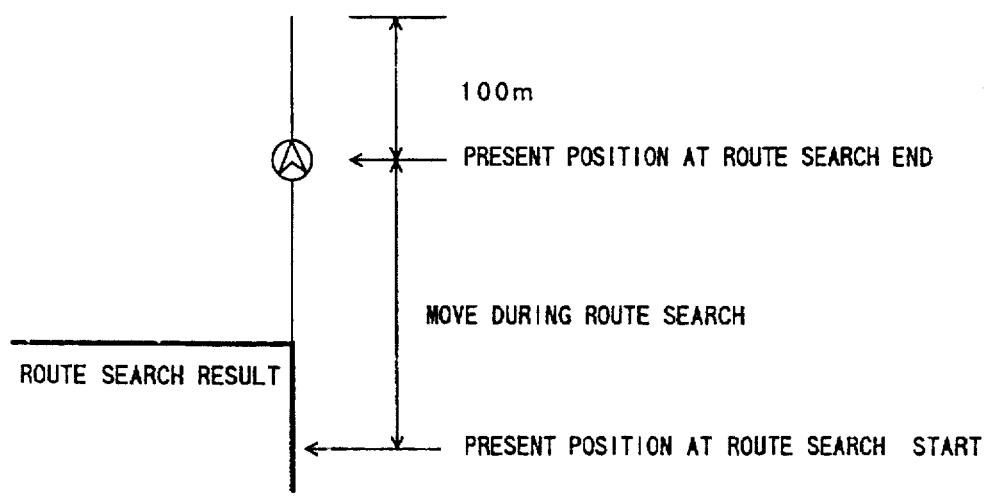
FIG. 22 is an explanatory diagram of a processing procedure in case the route is missed by the movement after a success in the route search.

In the automatic re-search, the present position may move during the search and may fail to run on the searched route at the end of the search, and hence a covered distance is set. This distance to be used is set to a predetermined value, e.g., 100 m. FIG. 22 shows the case in which the route as shown is searched by the re-search but the present position is moved during the search of the route out of the searched route.

Thus, at the end of this route re-search, another route re-search is executed again if the deviation from the route is such that the route cannot be followed even after travel of a predetermined distance. On the contrary, there may arise a case in which the already made route deviation is noticed at the end of the route re-search so that the route is restored. If the route is restored before the vehicle runs the predetermined distance by deciding the run of the predetermined distance while considering that case, the searched route is valid, and re-search is terminated.

Figure 23:
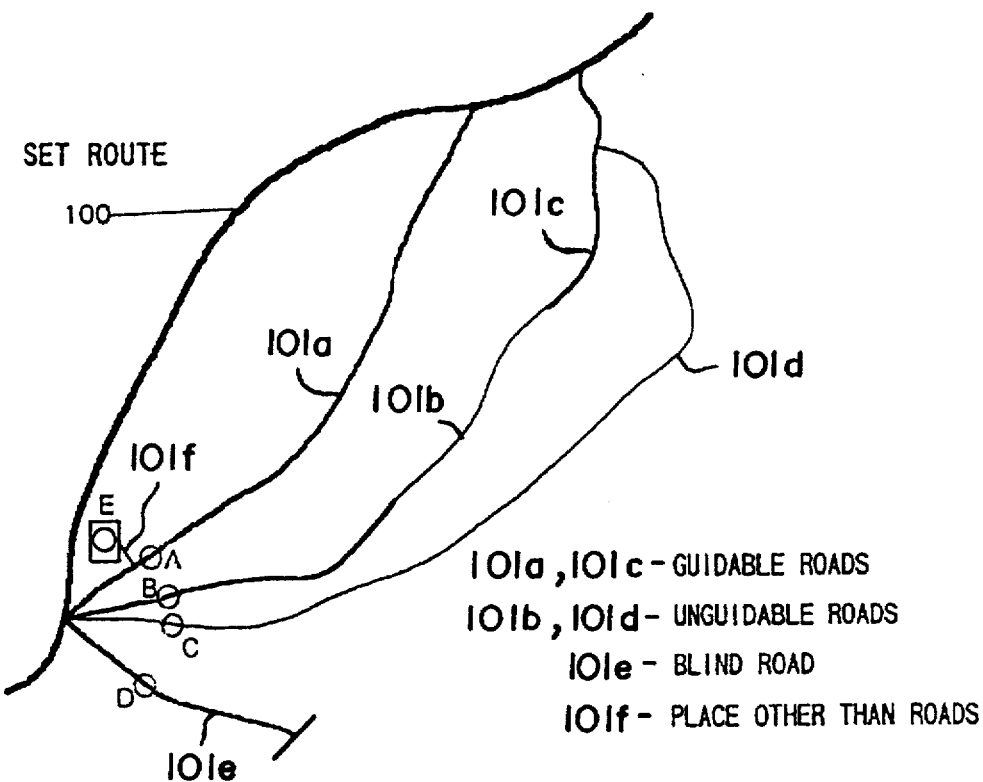
FIG. 23 is an explanatory diagram of the re-search at a route deviation time.

The automatic re-search when the route deviation is detected is described with reference to FIG. 23. Re-searches of the following cases are dependent upon what road attribute is owned by the route deviation road being followed or whether or not the present position belongs to an unguidable road or place (i.e., a road which is not registered in the information storage means). Specifically, case 1 is when a present position A is on a guidable road so that the vehicle can restore the set route (or previous route) 100 through a succeeding guidable road 101a; case 2 is when a present position B is on a guidable road leading to an unguidable road 101b over which there is on guidance information on the map but which can lead therethrough to a guidable road 101c; case 3 is where a present position C is on such an unguidable road 101d on the map and which leads to the road 101c capable of being guided on the map in the advancing direction; case 4 where a present position D is on a blind road 101e on the road network; and case 5 is where a present position E belongs to a place other than a route deviation road.

(Case 1)

Figure 24:
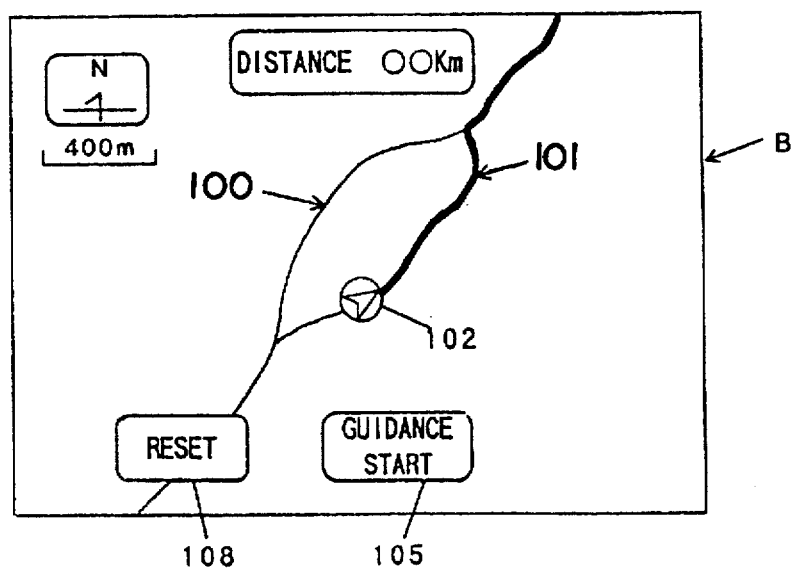
FIG. 24 is a diagram showing one example of the screen display of a section diagram after the route re-search.

In case there is the guidable road 101a from the present position A to the previous route 100, the search conditions for the re-search route are set, and the search is executed by taking preference to the advancing direction. If a route satisfying the conditions is found, the entire route according to the re-searched route is displayed. In the example shown in FIG. 24, the re-searched route joins the previous searched route and these routes are displayed in the diagram screen B together with road information of the route such as the distance to be covered and the time period required. A reset key 108, as arranged in this screen, can be depressed to reset the destination, and a guidance start key 109 can be depressed to start the guidance according to the new route. The construction can be modified by eliminating the reset key and the guidance start key such that if the route search succeeds, the information or message necessary for starting the route guidance is displayed to instantly start.

(Case 2)

Figure 25:
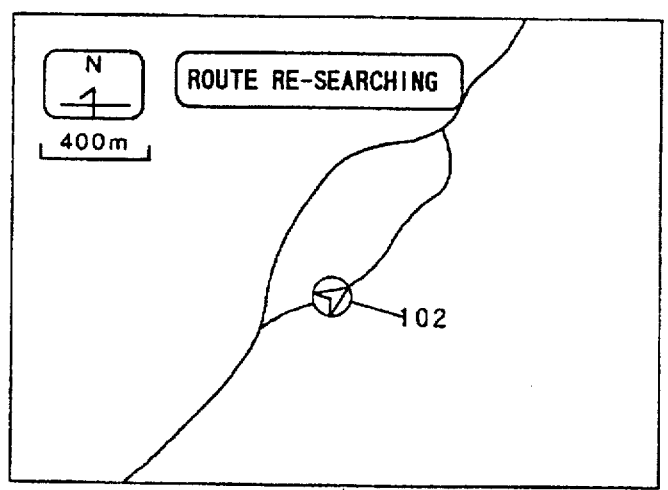
FIGS. 25a–25c present diagrams showing one example of screen transitions when the route search fails.
Figure 25:
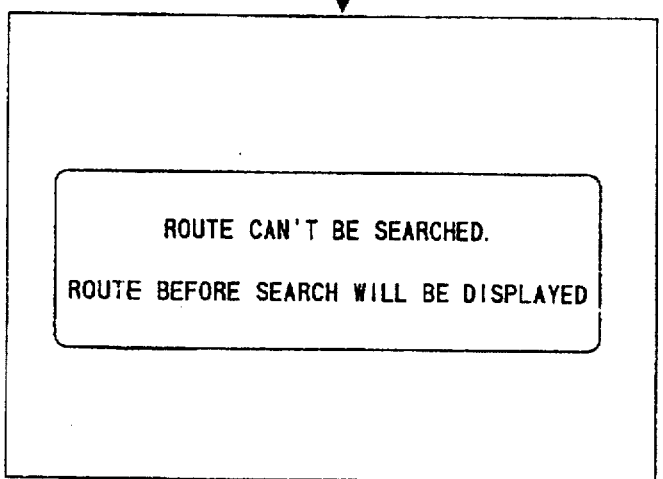
Figure 25:
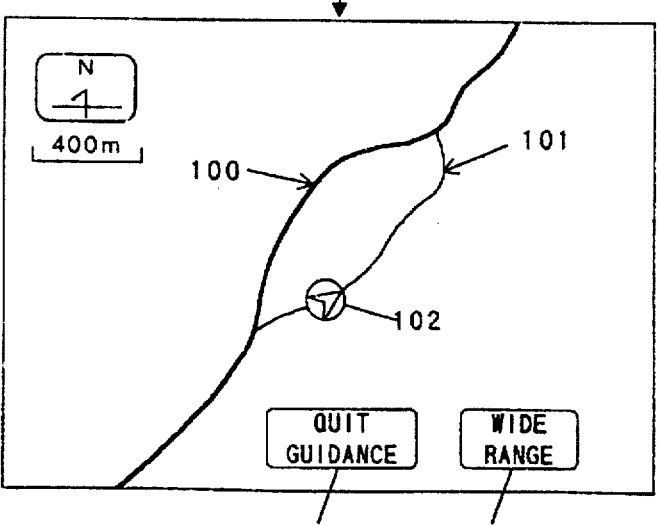

In case vehicle travel deviates from the set route to a guidable road to present position B where a route search in the advancing direction on the map cannot be completed because of the unguidable road 101b, the re-search is started but fails. The screen transitions during this attempted route re-searching are shown in FIGS. 25(a) to 25(c). FIG. 25(a) shows a route re-searching screen, in which the present position marker 102 is indicated on the route deviation road to inform the driver of the route re-search being conducted. When the search fails, the message "ROUTE CAN'T BE SEARCHED. ROUTE BEFORE SEARCH WILL BE DISPLAYED." is displayed in the screen of FIG. 25(b), and the diagram before the search, i.e., the previous route 100 is subsequently displayed, as shown in FIG. 25(c).

Figure 26:
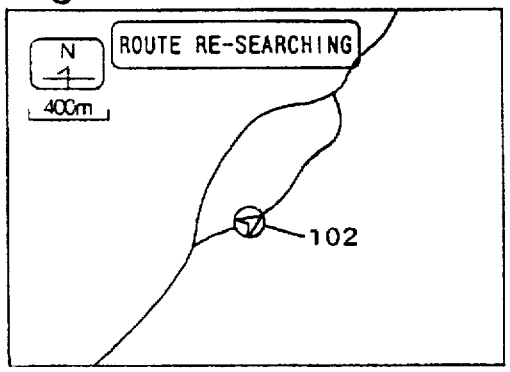
FIGS. 26a–26e present diagrams showing one example of screen transitions of the automatic route re-search in case the vehicle goes from a guidable road through an unguidable road to a guidable road.
Figure 26:
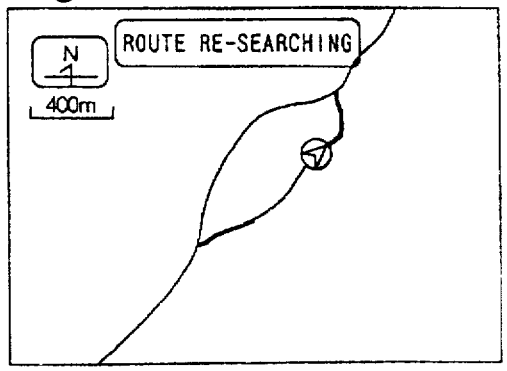
Figure 26:
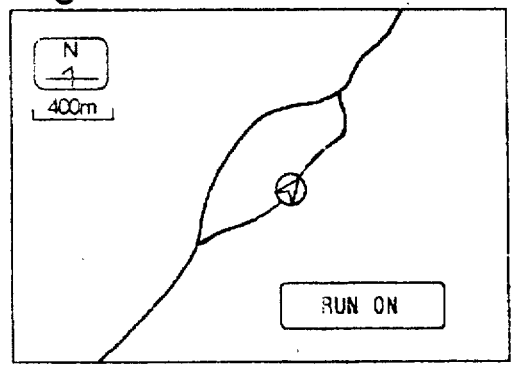
Figure 26:
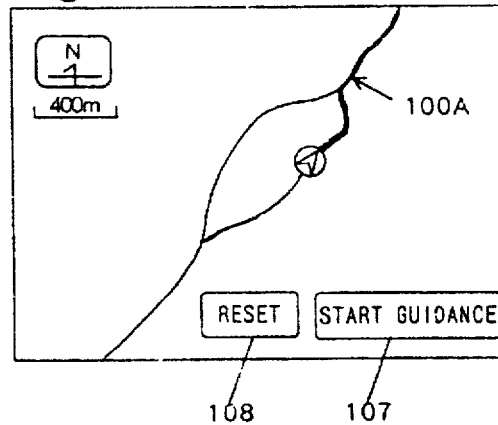
Figure 26:
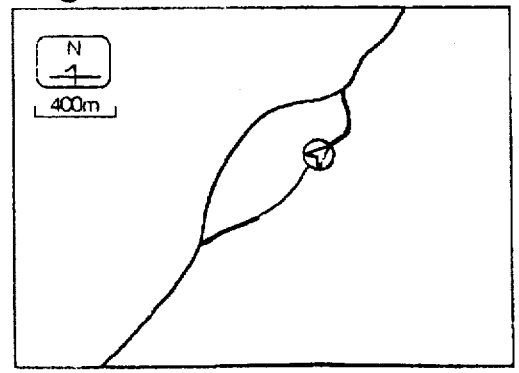

If the driver continues to travel from point B over the unguidable road 101b, the route re-search is started again. When the guidable road 101c is reached, the route search succeeds, and the route guidance is output. The screen transitions of this case are presented in FIGS. 26(a) to 26(e). The route re-search is executed and the screen of FIG. 26(a) is displayed. Since the present position is on the unguidable road 101b, the map screen for the route guidance cannot be displayed, and the screen is switched to that of FIG. 26(b) to display the message of "RUN ON". When the guidable road 101c is entered, as shown in FIG. 26(c), the route searching screen is again displayed, as shown in FIG. 26(d). The route is successfully re-searched, and a guide route 100A is subsequently displayed in the diagram screen shown in FIG. 26(e).

(Case 3)

In case the present position C is on the road 101d which lacks search and guidance information but leads to the road 101c which is capable of being searched in the advancing direction on the map, the route re-search reveals the unguidable road. Then, the run is continued as it is, and the route re-search is successfully performed when the guidable road 101c is entered. When the search succeeds, the diagram of the searched route is displayed. The screen transitions in this case 3 this time are similar to those of FIG. 26.

(Case 4)

In case vehicle travel deviates from the guidable road onto the road 101e to present position D, the re-search of the route fails because the road 101e leads to a dead end. The screen transitions are similar to that shown in FIGS. 25(a) to 25(c) except for the present position marker on road 110e. The original screen will continue to appear until the driver reverses travel direction at which time a successful re-search of the route can be completed.

(Case 5)

In case the present position E is on a place other than the route deviation road, such as a parking area, a private road or an open space, the re-search is successfully executed after the vehicle returns to a guidable road. Since, in this case, the destination can be set while the vehicle stands still, the route re-search is executed on conditions of the movement of a predetermined distance after the end of search and the run on the guidable road.

Figure 27:
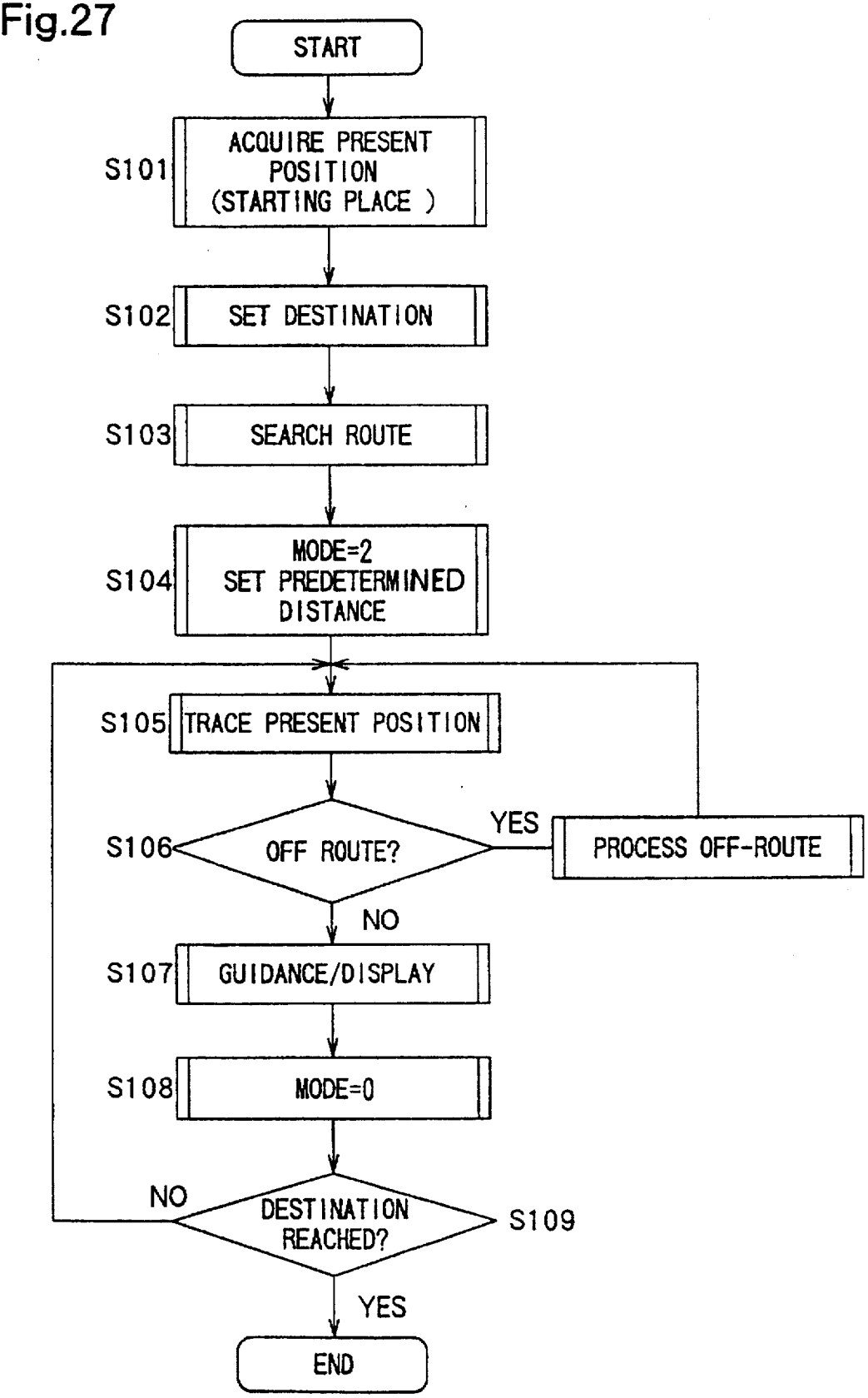
FIG. 27 is a flow chart showing the routine of the entire system.

The operation of the present system is illustrated by the routine flow diagram of FIG. 27 which shows the routine of the entire system. Incidentally, the processing flows of the contents to be displayed in the individual screens are omitted. A present position (or starting point) necessary for the route search is acquired at S101, a destination is set at S102 by inputting the destination setting conditions in the destination setting screen, and a route search is executed at S103. After this route search is ended, the mode for the automatic route re-search and a predetermined distance are set at S104 for a condition of movement through the predetermined distance at the end of the route search.

When the guidance start key is started for the searched route to start the route guidance, the present position is traced at S105 by measuring the position of the vehicle. Next, the distance from the present position to the set route is determined, and route deviation is decided at S106 depending upon whether or not the determined distance exceeds a predetermined value. If this question is affirmed, a route deviation routine is processed. Otherwise, the run is guided/displayed at S107 with the route subsequently set. A mode (MODE=0) for executing guidance on the route is set at S108. After this, the remaining distance from the present position to the destination is determined, and it is decided at S109 if the destination is reached, depending upon whether or not the remaining distance is below a predetermined value. If the remaining distance is below the predetermined value, the arrival at the destination is decided to end the route guidance. If, on the other hand, the remaining distance is not below the predetermined value, the routine returns to step S105, at which the present position is again traced.

Figure 28:
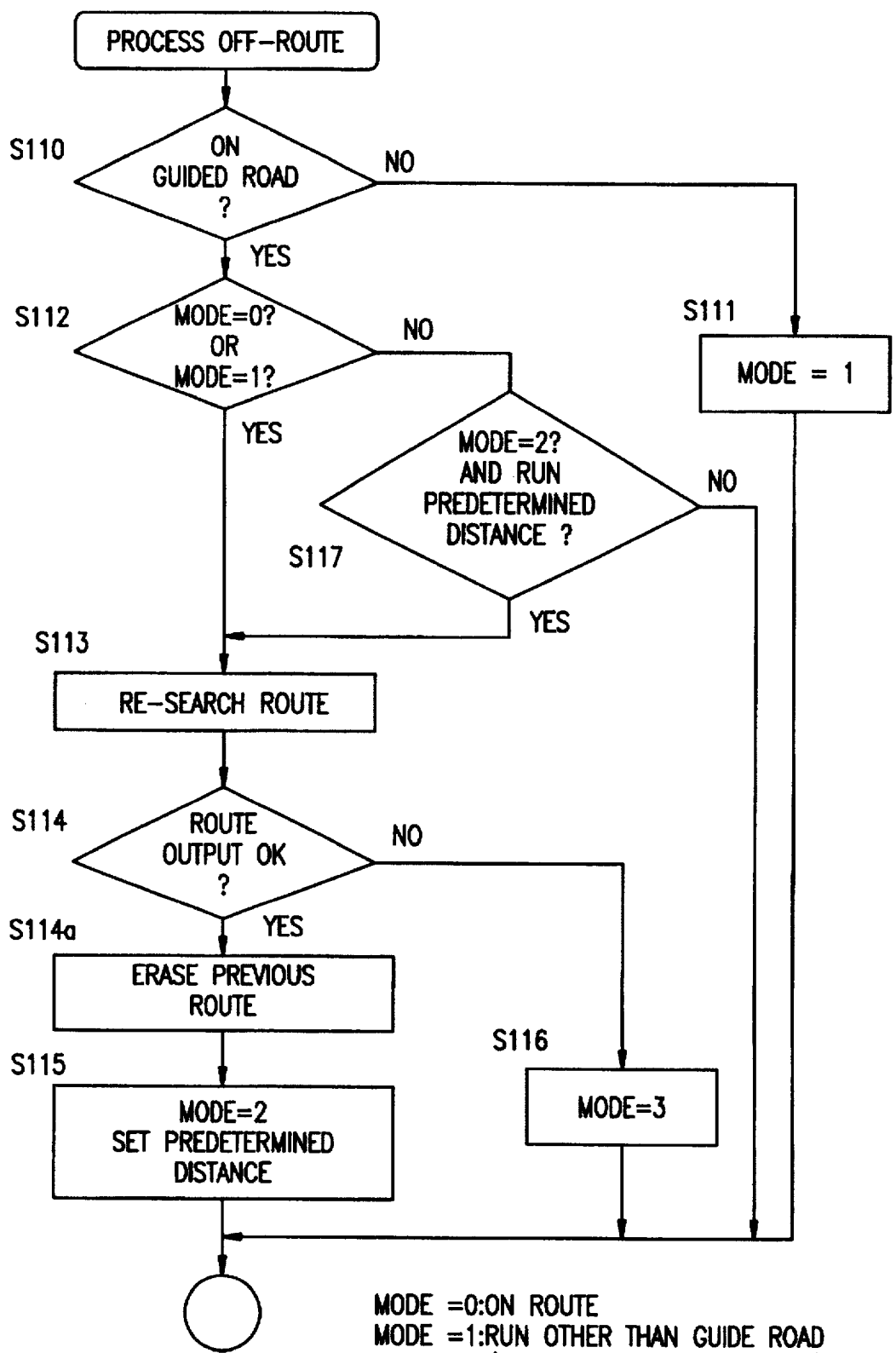
FIG. 28 is a flow chart showing a route deviation processing routine.

If a route deviation is detected at step S106, the route deviation processing routine is executed, as shown in FIG. 28. It is decided at S110 whether or not the vehicle is on a guidable road. If not on a guidable road, MODE 1 is set at S111. MODE=1 indicates that the vehicle is not on a guidable road so that the re-search is not executed until the vehicle reaches a guidable road.

If on a guidable road at S110, the present set mode is determined at S112. If the mode is "0" or "1", a route re-search is executed at S113. The mode will be "0" if the vehicle is deviating from a previous guide route and will be "1" if the vehicle reaches a guidable road after traveling on an unguidable road or place such as a parking area. If the set mode is not "0" or "1" at step S112, the route re-search has already been executed to have MODE=2, and it is decided at S117 whether or not the vehicle has run a predetermined distance. If MODE=2 is true and in the case of travel for the predetermined distance from the last re-search, the route re-search is executed at S113. If MODE=2 is true but vehicle travel has not run the predetermined distance, the routine returns to step S105.

After a route re-search, it is then decided at S114 whether or not the route has been found out by the re-search. If the route is searched, the preceding route is erased, and the re-searched route is displayed at S114a. The MODE=2 is set along with the predetermined distance (e.g., 100 m) at S115, and the routine returns to step S105. If the route search is found to have failed in S114, MODE=3 is set at S116, and the routine returns to step S105. MODE=2 indicates that the search has been ended. Moreover, MODE=3 indicates that the search has failed.

The setting of the predetermined distance at step S115 takes the following case into consideration. The present position may move during the route re-search, and the driver can quickly return to the route even if the vehicle has already gone off the route at the end of the search. Therefore, while a route deviation occurs prior to completion of travel of the predetermined distance, only the present position is traced without any re-search. The route is re-searched when the vehicle position is not found on the searched route after travel of the predetermined distance.

This routine will be described in connection with Case 2. Since the vehicle is off the route 100 but is running on a guidable road, the route deviation processing routine is executed but the road turns into an unguidable road 101b so that the search fails and MODE=3 is set. When the vehicle then runs from the unguidable road onto the guidable road 101c, the route re-search is executed. This re-search is successful, the previous stored route guide data is replaced by the results of the re-search, and MODE=2 is set along with the predetermined distance. It is then decided at step S106 whether or not the vehicle is running on the searched route. If this run on the route is detected within the predetermined distance, the guidance is executed along the re-searched route.

The foregoing embodiment has been described such that if the re-search on the guidable road succeeds in the route search, the route is set to trace the present position to execute the route guidance unless route deviation is detected. However, in case the vehicle is on an unguidable road or in case a predetermined distance is set after the end of the search so that the vehicle is running on the previous route after the run of the predetermined distance, the search result becomes invalid. This is performed by the structure of the block diagram of FIG. 18 by the predetermined distance setting portion after the end of search; predetermined distance run detecting portion for detecting travel of the predetermined distance; and previous route detecting portion for determining if the vehicle is running on the previous route on the basis of the detection result.

Figure 29:
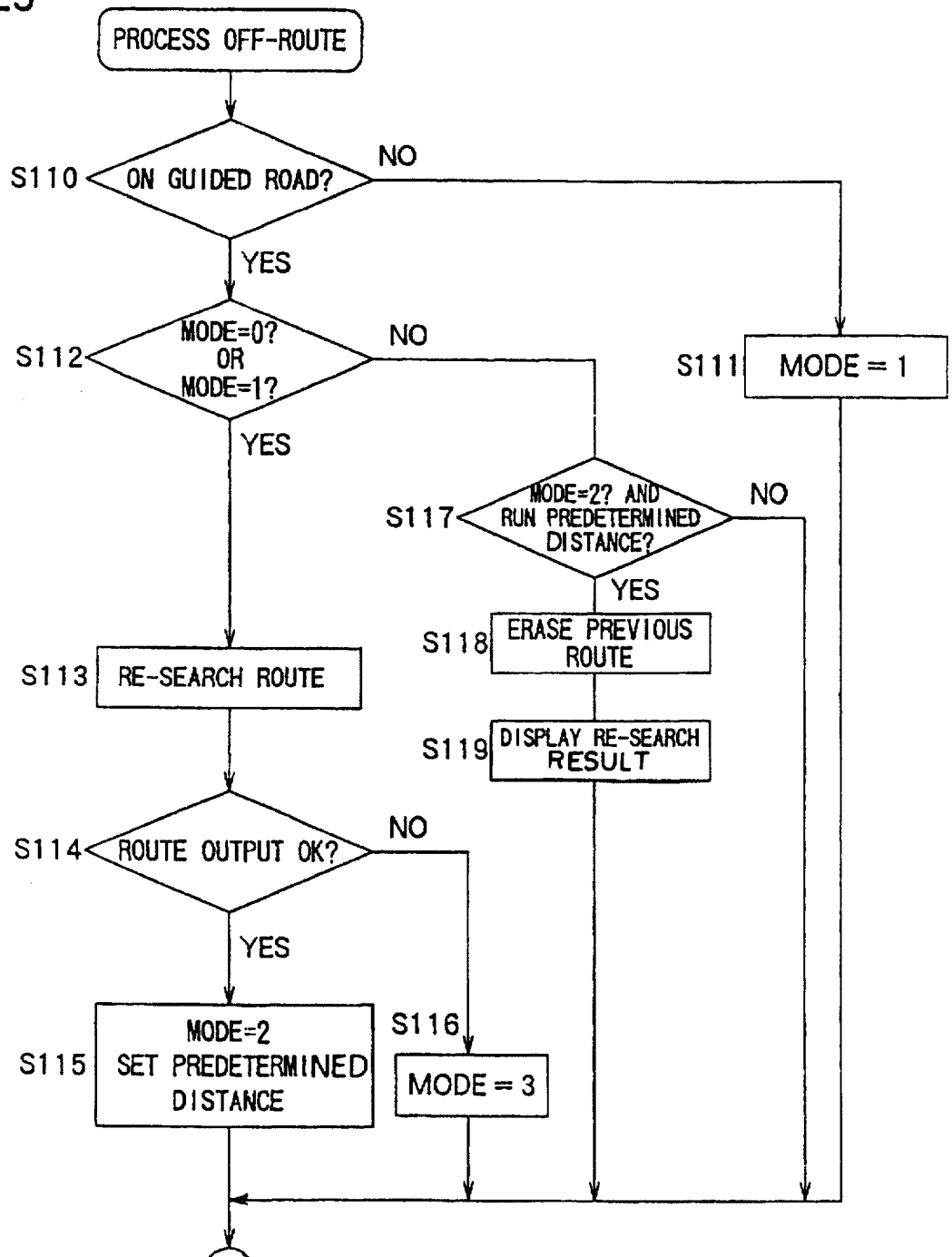
FIG. 29 is a flow chart showing the route deviation processing routine with the previous route being displayed.

A modified route deviation processing routine is described with reference to FIG. 29. The steps identical to those of FIG. 28 are designated by common reference characters. The present example is characterized in that the following steps are executed with the previous route being displayed although the result of the route re-search is not displayed. Specifically, when the set mode (MODE=2) indicates the vehicle is neither on the searched route nor on a guidable road at step S112 and the route re-search has already been executed, it is decided at S117 whether or not MODE=2 and whether or not the run of a predetermined distance has been executed. If MODE=2 and if the run of the predetermined distance has been executed, the previous route is erased at S118 and updated to the searched route, and the re-search result is displayed at S119, until the routine returns to step 105. If the conditions for MODE=2 and the predetermined distance run are not satisfied, the routine returns to step S105. At next step S106, the off-route from the previous route is decided. Hence, if the vehicle returns to the previous route, the search result is not displayed, and the guidance is continued according to the previous route.

According to this construction, there is no need for searching a new route when the vehicle returns to the previous route, so that any unnecessary search can be eliminated.

Moreover, the aforementioned previous route detecting portion for deciding whether or not the vehicle is running on the previous route may be replaced by means for deciding whether or not the vehicle is running on the searched route after it has run the predetermined distance set after the end of the search, so that the search result may be output only in the case of travel on the searched route. Then, the vehicle always runs on the searched route so that the driver is not required to search the route but is lightened from the burden on the drive.

According to a first aforementioned construction, when the route deviation detecting means detects the route deviation from the information of the present position and the set route, the guide road propriety deciding means decides whether or not the present position is on a guidable road. The re-search means searches the route when it is decided that the present position is on a guidable road or otherwise in case the vehicle has run on the guidable road.

According to a the second construction, if the vehicle is off the route at the end of the route search, the re-search of the route is executed in case the vehicle has run onto a guidable road after movement of the predetermined distance.

According to the present invention, the re-search can be accomplished with the present data but without bewildering the driver. Especially, a guidable road and an unguidable road are discriminated so that the search is not executed in case the vehicle is on an unguidable road. Thus, there is eliminated the drawback of the prior art that the user is obliged to run by himself from the unguidable road to the searched route thereby to search that route. In case the vehicle is on a guidable road, on the other hand, the route is searched so that the run guidance can be reliably started from the present position with the searched route. Thus, the route search is executed on condition of the run on the guidable road so that the searched route need not be sought for to lighten the burden upon the user.

Because of the provision of the predetermined distance run portion for deciding at the end of a search whether or not a run of a predetermined distance has been made, the newly searched route need not be newly displayed in case the user has a will to return the route being displayed or in case the previous route is restored during the route search or reached as a result that a run of the distance predetermined at the end of the search is made. As a result, it is possible to output no search result thereby to satisfy the user with the route guidance.

What is claimed is:

1. A vehicular navigation system comprising:

destination setting means for setting a destination;

storage means containing stored map information and stored guide information for guidable and unguidable roads, a guidable road being a road for which said storage means contains sufficient map information and guide information for the navigation system to include the road in searching to determine a route and to provide guidance for the road;

detecting means for detecting a present position and an advancing direction of a vehicle;

route searching means for searching, among said guidable roads, to determine a route from the present position to the destination on the basis of the stored map and guide information in said storage means;

guide means for providing travel guidance based upon the searched route and subsequently detected present positions on the searched route;

route deviation detecting means for detecting a deviation of travel from the searched route based on a subsequent detected present position deviating from the searched route;

guide road propriety deciding means, responsive to the route deviation detecting means detecting a deviation of travel, for deciding whether or not the detected deviating present position is on a guidable road; and re-search means for re-searching the route based on the stored map and guidance information in said storage means on condition that the route deviation is detected by said route deviation detecting means and that it is decided by said guide road propriety deciding means that the detected deviating present position is on the guidable road so that said guide means provides guidance on the basis of the route which is researched by said re-search means.

2. A vehicular navigation system comprising:

destination setting means for setting a destination;

storage means containing stored map information and stored guide information;

detecting means for detecting a present position and an advancing direction of a vehicle;

route searching means for searching a route from the present position to the destination on the basis of the stored map and guide information in said storage means;

guide means for providing travel guidance based upon the searched route and subsequently detected present positions on the searched route;

route deviation detecting means for detecting a deviation of travel from the searched route based on a subsequent detected present position deviating from the searched route;

guide road propriety deciding means, responsive to the route deviation detecting means detecting a deviation of travel, for deciding whether or not the detected deviating present position is on a guidable road;

re-search means for re-searching the route on the basis of the stored map and guidance information in said storage means on condition that a deviation of travel is detected by said route deviation detecting means and that it is decided by said guide road propriety deciding means that the detected deviating present position is on a guidable road;

predetermined travel distance deciding means for deciding whether or not the vehicle has traveled a predetermined distance after the end of the route re-search by said re-search means; and said guide means providing travel guidance based on the route which is re-searched by said re-search means, when the predetermined travel distance deciding means decides that the vehicle has traveled the predetermined distance, and providing travel guidance on the basis of the searched route, when the predetermined travel distance deciding means decides that the vehicle has not traveled the predetermined distance.

3. A vehicular navigation system comprising:

destination setting means for setting a destination;

storage means containing stored map information and stored guide information;

detecting means for detecting a present position and an advancing direction of a vehicle;

route searching means for searching a route from the present position to the destination on the basis of the stored map and guide information in said storage means;

guide means for providing travel guidance based upon the searched route and subsequently detected present positions on the searched route;

route deviation detecting means for detecting a deviation of travel from the searched route based on a subsequent detected present position deviating from the searched route;

guide road propriety deciding means, responsive to the route deviation detecting means detecting a deviation of travel, for deciding whether or not the detected deviating present position is on a guidable road;

predetermined travel distance deciding means for deciding whether or not the vehicle has traveled a predetermined distance after the end of a previous route re-search, responsive to detection of a deviation of travel from the searched route;

re-search means for newly re-searching the route on the basis of the stored map and guidance information in said storage means on condition that a deviation of travel is detected by said route deviation detecting means, on the condition that it is decided by said guide road propriety deciding means that the detected deviating present position is on a guidable road and, in the case of a previous route re-search, on the condition that the vehicle has travelled the predetermined distance;

said guide means providing travel guidance based on the route newly re-searched by said re-search means, in the case of the previous route re-search when the predetermined travel distance deciding means decides that the vehicle has traveled the predetermined distance, and providing travel guidance on the basis of the previous route re-search, when the predetermined travel distance deciding means decides that the vehicle has not traveled the predetermined distance.

* * * * *